(12) United States Patent
Mikami

(10) Patent No.: US 9,739,647 B2
(45) Date of Patent: Aug. 22, 2017

(54) METER

(71) Applicant: YAZAKI CORPORATION, Tokyo (JP)

(72) Inventor: Hirobumi Mikami, Shimada (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/207,919

(22) Filed: Mar. 13, 2014

(65) Prior Publication Data
US 2014/0192511 A1    Jul. 10, 2014

Related U.S. Application Data

(63) Continuation of application No. PCT/JP2012/075735, filed on Sep. 27, 2012.

(30) Foreign Application Priority Data

Sep. 29, 2011  (JP) ................ 2011-215046

(51) Int. Cl.
*G01D 11/28* (2006.01)
*G01D 13/02* (2006.01)
*B60K 37/02* (2006.01)

(52) U.S. Cl.
CPC ............ *G01D 11/28* (2013.01); *B60K 37/02* (2013.01); *G01D 13/02* (2013.01); *B60K 2350/203* (2013.01)

(58) Field of Classification Search
CPC ......... G01D 11/28; G01D 13/02; B60K 37/02
USPC .......................... 362/23.16, 23.11
See application file for complete search history.

(56) References Cited

U.S. PATENT DOCUMENTS

| | | | |
|---|---|---|---|
| 6,318,872 B1 | 11/2001 | Kato et al. | |
| 7,525,446 B2* | 4/2009 | Shibata | 340/815.4 |
| 2004/0129197 A1* | 7/2004 | Nakagawa et al. | 116/28 R |
| 2007/0186843 A1* | 8/2007 | Tsurumi | G01D 13/265 |
| | | | 116/286 |

(Continued)

FOREIGN PATENT DOCUMENTS

| | | |
|---|---|---|
| CN | 201757654 U | 3/2011 |
| DE | 100 25 244 A1 | 11/2000 |

(Continued)

OTHER PUBLICATIONS

Machine translation of JP 2004-249859A to "Ishizuka", published Sep. 9, 2004.*

(Continued)

*Primary Examiner* — Peggy Neils
*Assistant Examiner* — William N Harris
(74) *Attorney, Agent, or Firm* — Morgan, Lewis & Bockius LLP

(57) ABSTRACT

A meter includes at least one meter unit, a visor provided around the meter unit; and a light-emitting part. The light-emitting part includes a light-guiding ring, a light source and a prism provided between the light guiding ring and the light source. The light-emitting part is annularly provided so as to cover an outer periphery of a dial panel of the meter unit. The light guiding ring is composed of a light guiding body and a light shielding body. The light shielding body is integrally formed with the light guiding body so as to cover the light guiding body. The light guiding ring is fixed to a mounting part provided in a proximity of an end part of the visor.

8 Claims, 4 Drawing Sheets

(56) References Cited

U.S. PATENT DOCUMENTS

| | | | |
|---|---|---|---|
| 2009/0103278 A1* | 4/2009 | Miyashita | 362/29 |
| 2009/0219730 A1* | 9/2009 | Syfert et al. | 362/489 |
| 2013/0087092 A1* | 4/2013 | Hashimoto | G01D 11/28 |
| | | | 116/286 |

FOREIGN PATENT DOCUMENTS

| | | | |
|---|---|---|---|
| JP | 2004-132757 A | 4/2004 | |
| JP | 2004-249859 A | 9/2004 | |
| JP | 2004-257749 A | 9/2004 | |
| JP | 2009-504502 A | 2/2009 | |
| JP | WO 2012057035 A1 * | 5/2012 | G01D 11/28 |

OTHER PUBLICATIONS

International Search Report dated Jan. 28, 2013 for International application No. PCT/JP2012/075735.
Chinese Office Action issued in Chinese Patent Application No. 201280046908.5 on May 25, 2015.
Japanese Office Action issued in Japanese Patent Application No. 2011-215046 on Jun. 23, 2015.

\* cited by examiner

METER

CROSS REFERENCE TO RELATED APPLICATIONS

This application is a continuation of PCT application No. PCT/JP2012/075735, which was filed on Sep. 27, 2012 based on Japanese Patent Application (No. 2011-215046) filed on Sep. 29, 2011, the contents of which are incorporated herein by reference.

BACKGROUND OF THE INVENTION

1. Field of the Invention

Present invention pertains to a meter that is equipped with meter units for vehicles, etc., such as odometers and tachometers.

2. Description of the Related Art

Meters mounted on vehicles such as cars, ships, airplanes etc. (Hereinafter referred to as vehicles) are known as conventional meters. One example of this type of the meters is shown in FIGS. 4A and 4B (PTL 1).

FIG. 4A is an expanded sectional view of the main section of a conventional meter, and FIG. 4B is an oblique perspective of the conventional meter. A light-emitting part (500) of the conventional meter (100) is composed of a light source (520), and a light guiding body (510S) which is composed of a light guiding member and is provided between the light source (520) and a meter cover member (210), and a visor (300) which is made from a housing part, and is adjacent to both sides of the light guiding body (510S). And, the light emitter (510) is configured by the light guiding body (510S) and the visor (300). Also, the end of the light guiding body (510S) is provided so as to cover the outer periphery of the dial board (210).

Meter units (200) shown in FIG. 4B are, from the left side of the figure, the tachometer (200c), speedometer (200a), the fuel gauge (200d). The light emitter (510) is provided around the outer periphery of each of the meter units (200). And, when the light source (520) is turned on during the night, etc., it is disclosed that the emitted light from this light source (520) enters from the rear end part of the light guiding body (510S), and will be irradiated from the front end part of the light guiding body (510S) though the light guiding body (510S).

CITATION LIST

Patent Literature

[PTL 1] JP-A-2004-257749

SUMMARY OF THE INVENTION

Regarding the meter (100) that is mentioned in the PTL 1, the light emitter (510) provides the light emission by the light guiding body (510S), but the light guiding body (510S) is provided so as to be sandwiched by the ends of the visor (300). For this reason, the outer appearance and forms, etc., of the visor (300) are restricted, and as shown in FIG. 4B, the light guiding body (510S) are only provided in the proximity of each of the meter unit (200), and can only be in a nearly circular shape. The design freedom is low, and it is difficult to accommodate the outer appearance and design of the entire meter (100). Meters (100) for cars are especially desired to have an improved display appearance quality, because, besides their intended purpose, the meters (100) are positioned where the driver see them all the time; but the meters (100) haven't been able to satisfy these desires.

Present invention has been implemented in view of the circumstances, and an object of the present invention is to simplify the form of the light emitter, allow more freedom regarding its positioning; and to aim for a stable luminance of the light emitter while providing a meter with an improved display appearance quality.

In order to achieve objects, the meter that pertains to present invention has the characteristics (1) through (4) below.

(1) A meter, comprising:
  at least one meter unit;
  a visor provided around the meter unit; and
  a light-emitting part including a light-guiding ring, a light source and a prism provided between the light guiding ring and the light source, the light-emitting part being annularly provided so as to cover an outer periphery of a dial panel of the meter unit;
  wherein the light guiding ring is composed of a light guiding body and a light shielding body, the light shielding body is integrally formed with the light guiding body so as to cover the light guiding body, and the light guiding ring is fixed to a mounting part provided in a proximity of an end part of the visor.

(2) In the meter according to (1), the light guiding body is formed so as to be progressively or incrementally narrower toward an end of the light guiding body, and the end of the light guiding body is provided so be projected from the light shielding body.

(3) In the meter according to (1) or (2), the light guiding ring includes a diffusing material provided in a rear part of the light guiding body.

(4) In the meter according to one of (1) through (3), the prism is provided inside a leg formed in the visor, and the prism is provided so that there is space between the prism and the light guiding ring.

According to (1), the light of the light source will reliably be guided to the light guiding body of the light guiding ring through the prism. And the light that enters the light guiding body will emit light at the end of the light guiding body with a constant luminance without leaking out from the light shielding body. It is possible to provide with a meter equipped with a light guiding ring with a good three-dimensionality.

According to (2), the light emission efficiency at the end of the light guiding body is improved. And, it is possible to achieve a stable light emission.

According to (3), the light source light that is transmitted through the prism is diffused within the diffusing material. And it is able to emit light evenly from the light guiding body.

According to (4), it is possible to guide the light that is light guided in one direction inside the prism to the light guiding body. It is possible to suppress as much as possible the decay of light inside the prism.

According to present invention, you can freely place the light guiding ring in accordance to the placements of meter units, and can reliably guide the light source light to the light guiding body in compliance with the depth form of the visor. It is possible to provide a meter that improves the outer appearance quality of meter units especially during night-time, etc.

We have briefly described present invention. By further reading through the forms to realize present invention that is described below referring to the attached Figures, the details of present invention shall be further clarified.

BRIEF DESCRIPTION OF THE DRAWINGS

FIG. 2A is a close-up of II (A) in FIG. 1, and FIG. 2B is a close-up of II (B) in FIG. 1.

DETAILED DESCRIPTION OF THE EXEMPLARY EMBODIMENTS

Below, we explain in detail about a preferred embodiment that pertains to present invention, referring to the diagrams.

Figure 1:
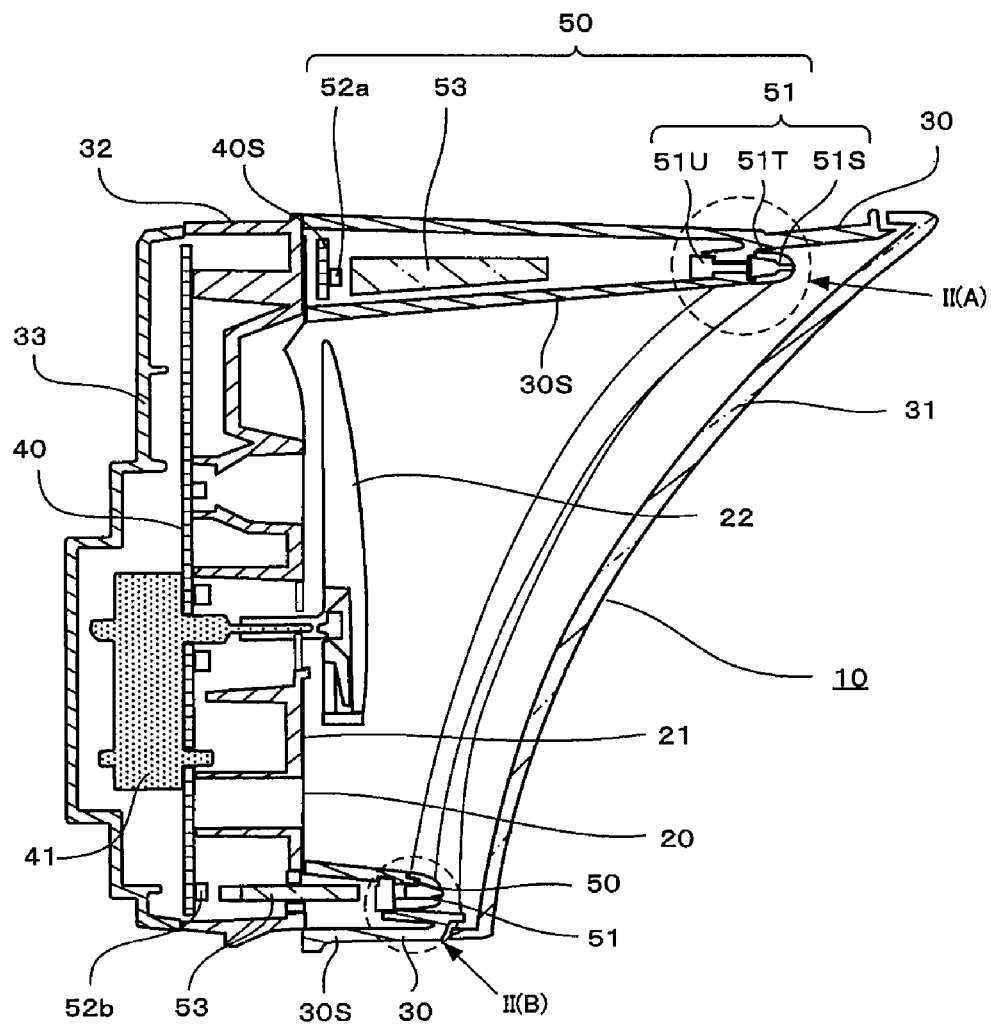
FIG. 1 is a cross-section diagram that shows one embodiment of a meter that pertains to present invention.

We will describe the meter (10) which is one embodiment of present invention, based on FIG. 1.

FIG. 1 is a cross-section diagram that shows a main section of the meter (10). The meter (10) is composed of multiple meter units (20) provided in the proximity of the center part of the meter (10), a visor (30) provided on the outer periphery of the meter (10) so as to surround the dial panel (21) and the needle (22) of the meter units (20), a blank glass (31) that covers the front end of the visor (30), a case (32) provided in the rear end of the visor (30), and a back cover (33) that covers the rear end of the case (32). The dial panel (21) is attached to the front part (the visor (30) side) of the case (32). A wiring board (40) is attached to the rear part (the back cover (33) side) of the case. The movement (41) which has motors, etc., that fully turn and drive the needle (22) is attached to the rear part of the wiring board (40).

In the visor (30), a ring-like light-emitting part (50) surrounding the meter units (20) is provided. The light-emitting part (50) is comprised of an instrument light guiding ring (51) (light guiding ring (51)) that is provided in the proximity of the blank glass (31) in the proximity of the end positioned in the front end of the visor (30) and a light source (52) comprised of LEDs etc. that are mounted on the wiring board (40), and a prism (53) comprised of light translucent synthetic resin material such as acrylic for guiding the light of the light source (52) to the light guiding ring (51). Also, multiple light sources (52) are set along the prism (53) that is annularly provided. We will explain in detail placement examples of the light guiding ring (51) in FIG. 3.

Also the placement situation for the prism (53) is different between the upper part (the up direction in FIG. 1) of the visor (30) and the lower part (the down direction in FIG. 1). That is, in the upper part of the visor (30), the prism (53) is provided inside the leg (30s) of the visor (30) and, at the same time, the light source (52) (shown in the Figure as light source (52a)) and the ring illumination wiring board (40S) is also provided inside the leg (30S). On the other hand, in the lower part of the visor (30), the front part of the prism (53) is provided inside the leg (30S), but the rear part of the prism (53) passes through the case (32), and its rear end is provided in the proximity of the light source (52) (shown in the Figure as light source (52b)) which is mounted on the wiring board (40).

Also, the light that is emitted from the light source (52) is transmitted through the prism (53) and is guided with a set directionality and enters the light guiding ring (51) that is positioned so that there is space between it and the light emitting surface of the prism (53). By adjusting the length of the prism (53), it becomes possible to suppress as much as possible the decay of the light within the prism (53). At the same time, it becomes possible to adjust the amount of ht that enters the light guiding ring (51), and it becomes possible to achieve the desired luminance for the light guiding ring (51).

Figure 2A:
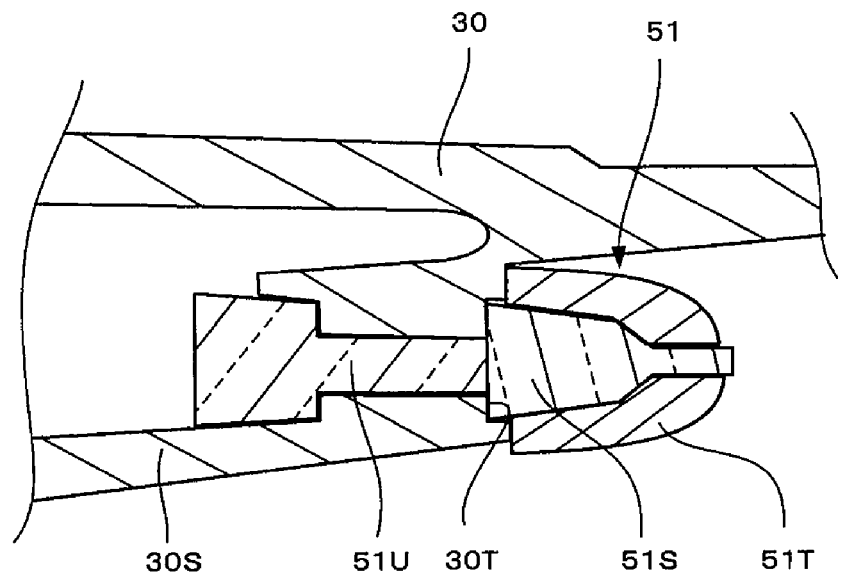
FIG. 2A and FIG. 2B show the light guiding ring that pertains to FIG. 1.
Figure 2B:
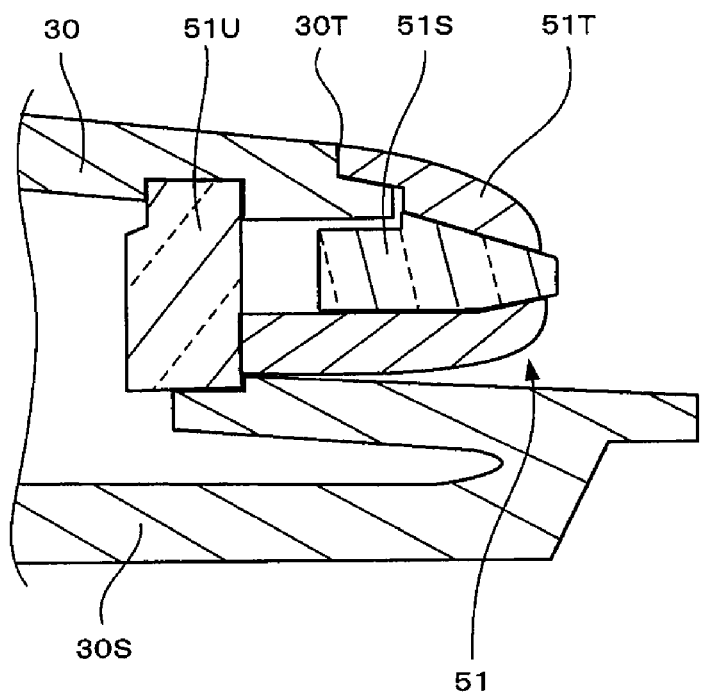

We will describe in detail the light guiding ring (51) using FIG. 2. FIG. 2A is a close-up of II (A) in FIG. 1, and FIG. 2B is a close-up of II (B) in FIG. 1.

The light guiding ring (51) is basically comprised of a light guiding body (51S) that is composed of a light translucent resin such as polycarbonates and acrylic, and a light shielding body (51T) that is composed of impermeable resin such as ABS resin, etc., that is provided so as to cover over the outer surface of the light guiding body (51S). The light shielding body (51T) prevents leaking to the outside the light that is transmitted through the light guiding body (51S), and improves the light emission efficiency of the light guiding body (51S).

Also, the light guiding body (51S) becomes progressively or incrementally narrower toward the end of the light guiding body (51S), and an end of the light guiding body (51S) slightly projects from the end of the light shielding body (51T). That is, it is in a state where the tip of the light guiding body (51S) is exposed in the center part of the light shielding body (51T). With the narrow tipped light guiding body (51S) and the light shielding body (51T), the emission luminance of the light guiding body (51S) can be adjusted, achieving the desired brightness.

Also, by applying a coating etc. or shaping it so that the surface of the light shielding body (51T) has luster, we can utilize the light that expands in the tip side direction of the light guiding body (51S), and shine the surface of the light shielding body (51T). Also by changing the material color of the light shielding body (51T), it is possible to achieve a design-like effect.

We mentioned above that the light guiding ring (51) is basically composed of a light guiding body (51S) and a light shielding body (51T), but the light guiding ring (51) can also be a composition that includes a diffusing material (51U). The diffusing material (51U) can be composed of a light translucent resin such as polycarbonates and acrylic and is provided in the rear part of the light guiding body (51S). The diffusing material (51U) is applied with texturing, etc., so that the light of the light source (52) will diffuse as the light passes through the diffusing material (51U). Also powders of metals, etc can be mixed in the diffusing material (51U).

Light emitted from the light source (52) is transmitted through the prism (53) and enters the diffusing material (51U), and is diffused inside the diffusion material (51U) and enters the light guiding body (51S). In general, on the emitting surface of the light guiding body (51S) that corresponds to the light source (52), there is a tendency for there to be a slightly stronger light emission when compared to the other parts, and may be observed as unevenness in the light. By using diffused light, we can get rid of the unevenness in the light emission of the light guiding body (51S)

The light guiding body (51S) and the light shielding body (51T) can be single-piece molded using insert molding or a two-color molding method. After molding the two elements, the light guiding body (51S) and the light shielding body (51T) can be joined in an integrated fashion. The light guiding ring (51) comprised of the light guiding body (51S) and the light shielding body (51T), is fixed by attaching it to the mounting part (30T) provided in the proximity of the end part of the visor (30). If the diffusing material (51U) is integrally formed to the light guiding body (51S), the diffusing material (51U) will be attached to the mounting part (30T) as one component part of the light guiding ring (51). But if it is integrally formed in the leg (30S) of the visor (30), the diffusing material (51U) is provided so there is space between the diffusing material (51U) and the rear part of the light guiding body (51S).

The cross-sectional shape of the light guiding ring (51), as is clear from comparing FIG. 2A and FIG. 2B, is different between the upper part and the lower part of the visor (30). With the light guiding body (51S) of the light guiding ring (51) in the upper part, the shape that projecting from the light shielding body (51T) is nearly flat in form, but with the light guiding body (51S) of the lower part, it is slanted. Also the light shielding body (51T) of the upper part is nearly the same shape, with the light guiding body (51S) sandwiched between, but in the lower part, the length is different.

On the other hand, the mounting position of the light guiding ring (51), as is clear from FIG. 1, is not only different regarding the lengthwise positions from the upper part and the lower part of the visor (30) but the center part is formed three-dimensionally with a curvature. That is, the mounting position of the light guiding ring (51) is displaced.

In this way, by changing the form and the mounting position of the light guiding ring (51) according to its location and, at the same time, by curving its center part, we can provide a light guiding ring (51) with good three-dimensionality. The same can be said about the positional relationship of the light guiding ring (51). Therefore, it is possible to provide a light guiding ring (51) with good three-dimensionality.

Figure 3:
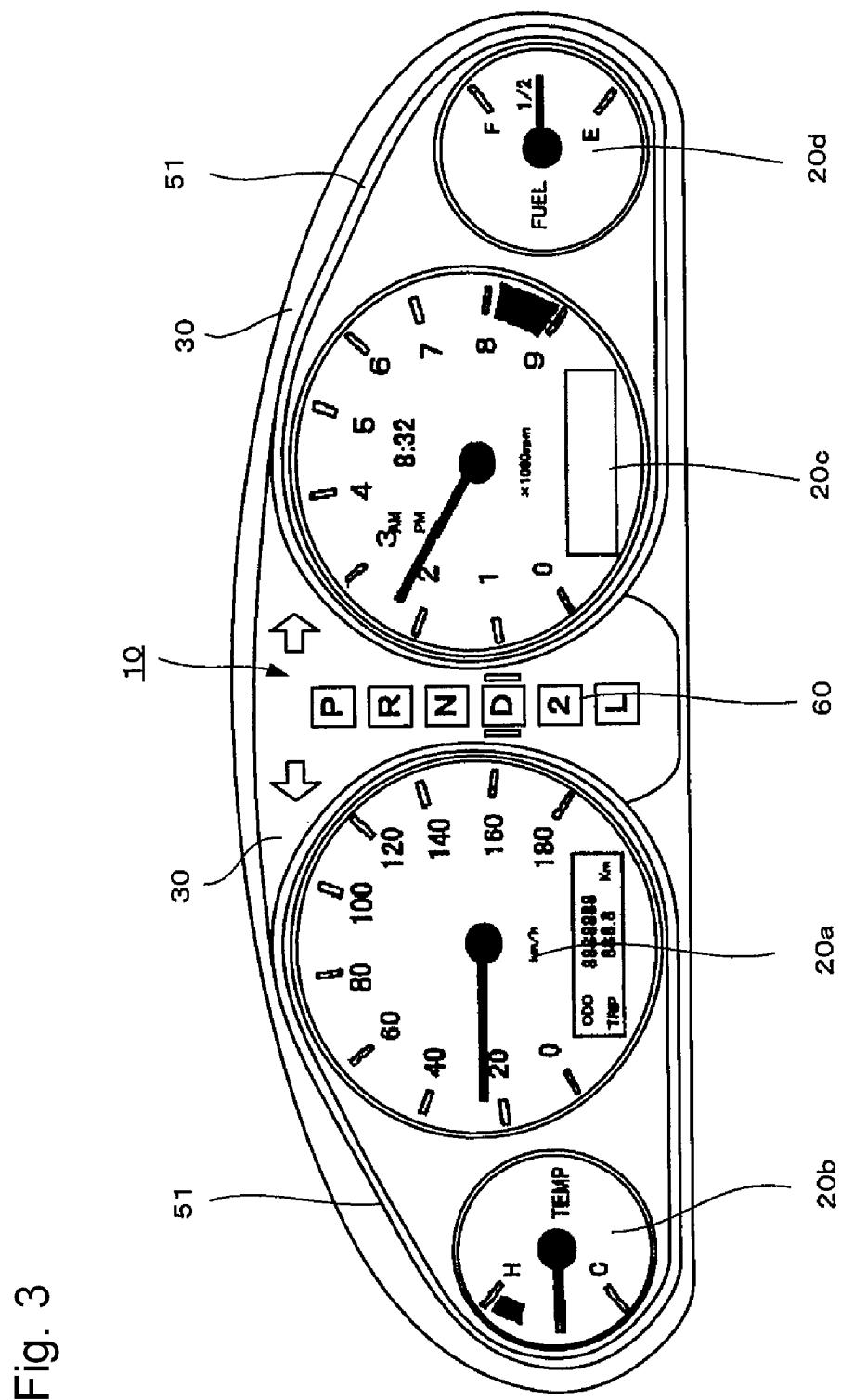
FIG. 3 is a frontal view of the meter that pertains to FIG. 1.
Figure 4A:
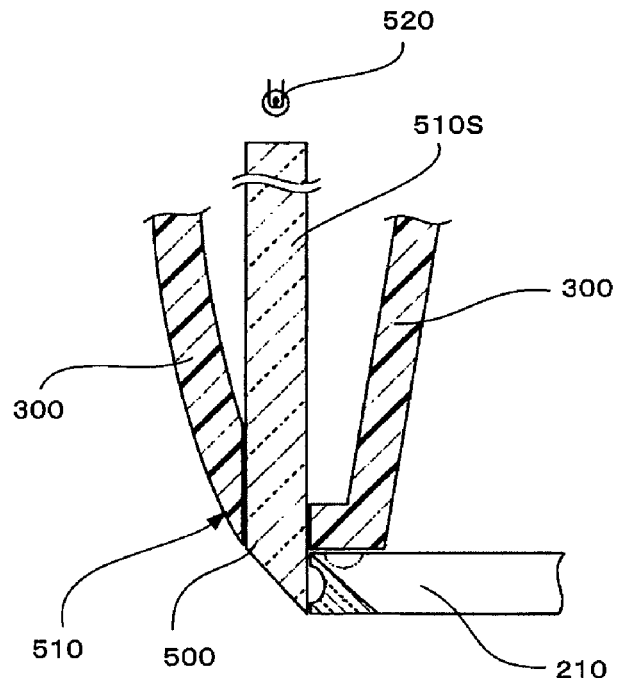
FIG. 4A is a close-up cross-section diagram of the main section of a conventional meter.
Figure 4B:
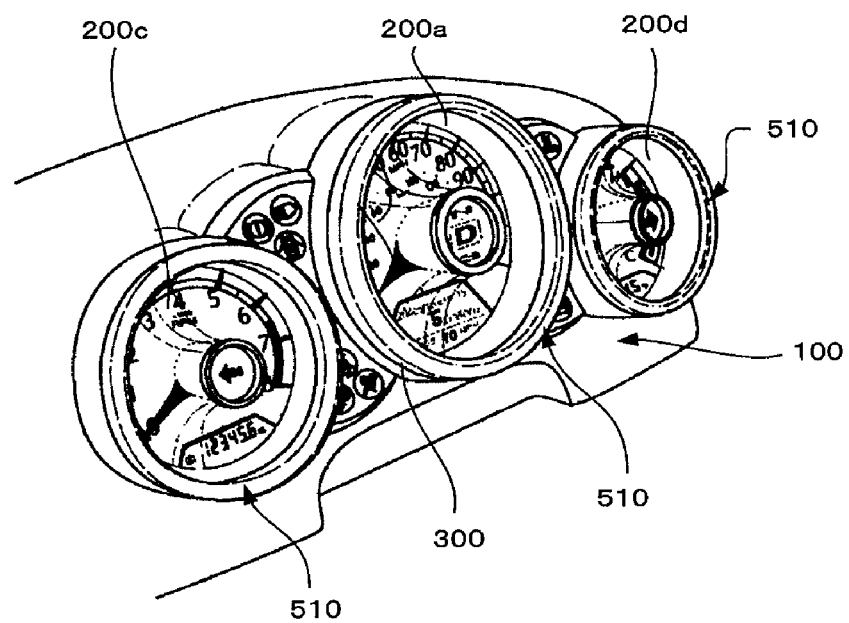
FIG. 4B is an oblique diagram of that meter.

We will describe one aspect of the placement of the light guiding ring (51). FIG. 3 is a frontal view of one embodiment of a meter that pertains to present invention.

In the meter (10), multiple meter units (20) are arrayed. On the left side of the shift indicator (60) (the left side of the Figure) is arranged the speedometer (20a) and the water temperature gauge (20b), and on the right side (of the Figure) is arranged the tachometer (20c) and the fuel gauge (20d). The light guiding ring (51) that pertains to present invention is provided so as to surround the speedometer (20a) and the water temperature gauge (20b) on the left side of the shift indicator (60), and the light guiding ring (51) is provided so as to surround the tachometer (20c) and the fuel gauge (20d) on the right side. That is to say, it is possible not only to place the light guiding ring (51) around a single meter and gauge (20), but also, as shown in one embodiment of present invention, to surround multiple meter units (20), and can be accordingly provided to match the requirements of the design.

The visor (30) is a component that includes the outer appearance configuration of the meter (10), and its outer appearance configuration is limited by the constraints to the design, etc., of the interior of the car. With the light guiding ring (51) that pertains to present invention, there is no need to be constrained by the outer appearance configuration or the lengthwise form of the visor (30), and can be freely provided around the meter units (20) based on the improvement in the display quality that is demanded by the meter (10).

Hence, the meter (10) that pertains to one embodiment of present invention is equipped with at least one meter and gauge (20), includes a visor (30), a case (32), and a back cover (33) that are provided around the meter units (20). And the light-emitting part (50) is comprised of a light guiding ring (51), a light source (50), and a prism (53) that is positioned between the meter units (20) and a dial panel (21). The light-emitting part (50) is positioned in a ring-like fashion so that it covers the outer periphery of the dial panel (21) of the meter units (20), and the light guiding ring (51) is comprised of a light guiding body (51S) and a light shielding body (51T) that is fixed to the mounting part (30T) that is provided in the proximity of the end part of the visor (30).

With this composition, the light of the light source (52) will reliably be guided to the light guiding body (51S) of the light guiding ring (51) through the prism (53), and the light that enters the light guiding body (51S) will emit light while maintaining a set luminance at the end of the light guiding body (51S), without leaking to the outside due to the light shielding body (51T), and can provide a meter (10) that is equipped with a light guiding ring (51) with a good three-dimensionality.

Also, in the meter (10) that pertains to one embodiment of present invention, the light guiding body (51S) is formed so that the light guiding body (51S) becomes progressively or incrementally narrower heading to the end, and the end of the light guiding body (51S) is provided so as to be projected from the light shielding body (51T). With this composition, the light emission efficiency at the end of the light guiding body (51S) is improved, and we can achieve a stable light emission.

Furthermore, in the meter (10) that pertains to one embodiment of present invention, the light guiding ring (51) is equipped with a diffusing material (51U) that is provided in the rear part of the light guiding body (51S). With this composition, the light source light that is transmitted through the prism (53) is diffused inside the diffusing material (51U) and we can emit even light from the light guiding body (51S).

And, in the meter (10) that pertains to one embodiment of present invention, the prism (53) is provided inside the leg (303) that is formed in the visor (30) and is provided with a space between the prism (53) and the light guiding ring (51). With this composition, we can guide the light that is light guided in a set direction within the prism (53) to the light guiding body (51S) and can suppress as much as possible the decay of light inside the prism (53).

The instrument light guiding ring (51) that pertains to one embodiment of present invention is provided in the visor (30) of the meter (10). And the light guiding ring (51) is comprised of the light guiding body (51S) and the light shielding body (51T), and the light shielding body (51T) is integrally formed with the light guiding body (51S) so as to cover the light guiding body (51S), and the light guiding ring (51) is fixed to the mounting part (30T) that is provided in the proximity of the end part of the visor (30), and The light guiding ring (51) is annularly provided so as to cover the outer periphery of the dial panel (21) of the meter units (20) of the meter (10). With this composition can deal with the light guiding ring (51) as a single entity, and it is possible to freely position it in accordance with the form of the visor (30), and with the light shielding body (51T), we can control the light of just the tip of the light guiding body (51S), and can improve the outer appearance quality of the meter units (20).

Also, in the instrument light guiding ring (51) that pertains to one embodiment of present invention, the light guiding body (51S) is formed so that the light guiding body (51S) becomes progressively or incrementally narrower toward the end of the light guiding body (51S), and the end of the light guiding body (51S) is provided so as to be projected from the light shielding body (51T). With this composition, the light emission efficiency at the tip of the light guiding body (51S) is improved, and it is possible to achieve a stable light emission that assures the desired luminance.

Furthermore, the instrument light guiding ring (51) that pertains to one embodiment of present invention is equipped with a diffusing material (51U) that is provided in the rear part of the light guiding body (51S). With this composition, it is possible to assuage the alternating strengthening and weakening of light that enters the light guiding body (51S), and be able to emit more even light from the light guiding body (51S).

Meanwhile, present invention is not limited to the above-mentioned embodiment, and suitable transfiguration, refinement, etc. are possible. Besides that, the materials, forms, dimensions, Figures, configurations, numbers, arrangement locations, etc. of each of the component part of the embodiment are arbitrary as long as they achieve present invention, and are not limited.

As noted, the light guiding ring (51) is fixed on the mounting part (30T) of the visor (30), but the mounting part (30T) can be provided all around the visor (30), or only partially around the visor. It is only necessary that the light guiding ring (51) be stably fixed in a set position within the meter (10), and depending on the location etc., and that the light guiding ring (51) be positioned to freely set the mounting part (30T).

By making the visor (30) a molded part that combines a light guiding material and a light shielding bodying material like the light guiding ring (51), it is possible to emit light from the visor (30). Also, by making the translucent material a diffusive material, it is possible to improve the uniformity of the light emission.

According to present invention, it is possible to freely place the light guiding ring in accordance to the placements of meter units. It is possible to reliably guide the light source light to the light guiding body in compliance with the depth form of the visor, and can provide a meter that improves the outer appearance quality of meter units especially during nighttime, etc.

What is claimed is:

1. A meter, comprising:
    at least one meter unit;
    a visor provided around the meter unit and having an upper half and a lower half; and
    a light-emitting part including a light-guiding ring, a light source and a prism provided between the light guiding ring and the light source, the light-emitting part being annularly provided so as to cover an outer periphery of a dial panel of the meter unit;
    wherein the light guiding ring is composed of a light guiding body and a light shielding body, the light shielding body is integrally formed with the light guiding body such that the light shielding body substantially covers a top portion of the light guiding body so as to expose only an end of the top portion of the light guiding body to emit light, and the light guiding ring is fixed to a mounting part provided in a proximity of an end part of the visor,
    wherein cross-sectional shapes of the light guiding body and the light shielding body are different between the upper half and the lower half of the visor, respectively, and
    wherein the end of the light guiding body that is exposed by the light shielding body has a cross-sectional flat shape in the upper half of the visor and a cross-sectional slanted shape in the lower half of the visor.

2. The meter according to claim 1, wherein the light guiding body is formed so as to be progressively or incrementally narrower toward the end of the light guiding body, and the end of the light guiding body is provided so as to be projected from the light shielding body.

3. The meter according to claim 1, wherein the light guiding ring includes a diffusing material provided in a rear part of the light guiding body.

4. The meter according to claim 1, wherein the prism is provided inside a leg formed in the visor, and the prism is provided so that there is space between the prism and the light guiding ring.

5. The meter according to claim 1, wherein the light guiding ring further surrounds one additional meter unit.

6. The meter according to claim 1, wherein the light shielding body is coated with a luster.

7. The meter according to claim 3, wherein there is a space between the diffusing material and the rear part of the light guiding body.

8. The meter according to claim 3, wherein the diffusing material includes powders of metals.

* * * * *